US008781471B2

(12) United States Patent
Fischer et al.

(10) Patent No.: US 8,781,471 B2
(45) Date of Patent: Jul. 15, 2014

(54) DEDICATED SIGNATURE ASSIGNMENT

(75) Inventors: Patrick Fischer, Reine (FR); Remi Feuillette, Paris (FR)

(73) Assignee: LG Electronics Inc., Seoul (KR)

( * ) Notice: Subject to any disclaimer, the term of this patent is extended or adjusted under 35 U.S.C. 154(b) by 488 days.

(21) Appl. No.: 12/669,180

(22) PCT Filed: Aug. 14, 2008

(86) PCT No.: PCT/KR2008/004755
§ 371 (c)(1),
(2), (4) Date: Jun. 15, 2010

(87) PCT Pub. No.: WO2009/022880
PCT Pub. Date: Feb. 19, 2009

(65) Prior Publication Data
US 2010/0255844 A1   Oct. 7, 2010

Related U.S. Application Data

(60) Provisional application No. 60/956,116, filed on Aug. 15, 2007, provisional application No. 60/976,148, filed on Sep. 28, 2007.

(51) Int. Cl.
*H04W 36/00* (2009.01)

(52) U.S. Cl.
USPC ........ 455/436; 455/437; 455/438; 455/432.1; 370/329

(58) Field of Classification Search
USPC ................ 455/436, 437, 438, 432.1; 370/329
See application file for complete search history.

(56) References Cited

U.S. PATENT DOCUMENTS

| 7,089,009 | B1 | 8/2006 | Fauconnier | |
| 2004/0053614 | A1* | 3/2004 | Il-Gyu et al. | 455/436 |
| 2010/0093386 | A1* | 4/2010 | Damnjanovic et al. | 455/522 |

FOREIGN PATENT DOCUMENTS

WO    99/01002    1/1999

OTHER PUBLICATIONS

Ericsson, "On the details of the dedicated preamble at intra-LTE handover" Jun. 29, 2007.*
ZTE, "Intra-LTE handover procedure by using dedicated signature," R2-070029, TSG-RAN Working Group 2 meeting #56bis, Jan. 2007, XP-050133144.
Nokia Siemens Networks et al., "Non contention based methods in HO," R2-072389, 3GPP TSG-RAN WG2 Meeting #58bis, Jun. 2007, XP-050135233.
Ericsson, "On the details of the dedicated preamble at intra-LTE handover," R2-072549, 3GPP TSG-RAN WG2 #58-bis, Jun. 2007, XP-050135363.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V8.1.0, Jun. 2007, XP-050377576.

* cited by examiner

*Primary Examiner* — Wayne Cai
*Assistant Examiner* — Chuck Huynh
(74) *Attorney, Agent, or Firm* — Lee, Hong, Degerman, Kang & Waimey

(57) ABSTRACT

Optimization of the LTE handover procedure is provided by presenting alternatives for allocating a dedicated signature used for contention-free random access during the handover procedure as well as using an expiry time for a dedicated signature and different alternative behaviors for a mobile terminal upon expiry of the dedicated signature.

4 Claims, 10 Drawing Sheets

DEDICATED SIGNATURE ASSIGNMENT

CROSS-REFERENCE TO RELATED APPLICATIONS

This application is a 371 U.S. national stage application of International Application No. PCT/KR2008/004755 filed on Aug. 14, 2008, which claims priority to U.S. Provisional Application Serial Nos. 60/956,116 filed on Aug. 15, 2007, and 60/976,148 filed on Sep. 28, 2007, the contents of each of which is hereby incorporated by reference herein in its entirety.

TECHNICAL FIELD

The present invention is directed to optimization of the LTE handover procedure and, specifically, to alternatives for allocating a dedicated signature used for contention-free random access during the handover procedure as well as using an expiry time for a dedicated signature and different alternative behaviors for a mobile terminal upon expiry of the dedicated signature.

BACKGROUND ART

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN) and an Evolved Packet Core (EPC) and one or more user equipment. The E-UTRAN may include one or more evolved NodeB (eNB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from an eNB 20 to a UE 10, and "uplink" refers to communication from the UE to an eNB. The UE 10 is communication equipment carried by a user and may also be referred to as a mobile station (MS), a user terminal (UT), a subscriber station (SS) or a wireless device.

An eNB 20 provides end points of a user plane and a control plane to the UE 10. The MME/SAE gateway 30 provides an end point of a session and mobility management function for a UE 10. The eNB 20 and MME/SAE gateway 30 may be connected via an Si interface.

The eNB 20 is generally a fixed station that communicates with a UE 10 and may also be referred to as a base station (BS) or an access point. One eNB 20 may be deployed per cell. An interface for transmitting user traffic or control traffic may be used between eNBs 20.

The MME provides various functions including distributing paging messages to the eNBs 20, security control, idle state mobility control, SAE bearer control, and ciphering and integrity protection of non-access stratum (NAS) signaling. The SAE gateway host provides assorted functions including termination of U-plane packets for paging reasons and switching the U-plane to support UE 10 mobility.

The MME/SAE gateway 30 will be referred to herein simply as a "gateway" for clarity. However, it is understood that the MME/SAE gateway 30 includes both an MME and an SAE gateway.

A plurality of nodes may be connected between the eNB 20 and the gateway 30 via the S1 interface. The eNBs 20 may be connected to each other via an X2 interface and neighboring eNBs may have a meshed network structure that has the X2 interface.

FIG. 2(a) is a block diagram depicting architecture of a typical E-UTRAN and a typical gateway 30. As illustrated in FIG. 2(a), the eNB 20 may perform functions such as selection for gateway 30, routing toward the gateway during a Radio Resource Control (RRC) activation, scheduling and transmitting paging messages, scheduling and transmitting Broadcast Channel (BCCH) information, dynamic allocation of resources to UEs 10 in both uplink and downlink, configuration and provisioning eNB measurements, radio bearer control, radio admission control (RAC), and connection mobility control in LTE_ACTIVE state. In the EPC, the gateway 30 may perform functions such as paging origination, LTE-IDLE state management, ciphering the user plane, System Architecture Evolution (SAE) bearer control, and ciphering and integrity protection of Non-Access Stratum (NAS) signaling.

FIGS. 2(b) and 2(c) are block diagrams depicting the user-plane protocol and the control-plane protocol stack for the E-UMTS. As illustrated in FIGS. 2(b) and 2(c), the protocol layers may be divided into a first layer (L1), a second layer (L2) and a third layer (L3) based upon the three lower layers of an open system interconnection (OSI) standard model that is well-known in the art of communication systems.

The physical layer, or first layer (L1), provides an information transmission service to an upper layer by using a physical channel. The physical layer is connected to a medium access control (MAC) layer located at a higher level through a transport channel, with data transferred between the MAC layer and the physical layer via the transport channel. Data is transferred via a physical channel between different physical layers, such as between the physical layer of a transmission side and the physical layer of a reception side.

The MAC layer of Layer 2 (L2) provides services to a radio link control (RLC) layer, which is a higher layer, via a logical channel. The RLC layer of Layer 2 (L2) supports the transmission of data with reliability. It should be noted that although the RLC layer is illustrated in FIGS. 2(b) and 2(c), the RLC layer is not required if the MAC layer performs the RLC functions.

The PDCP layer of Layer 2 (L2) performs a header compression function that reduces unnecessary control information. This allows efficient transmission of data utilizing Internet protocol (IP) packets, such as IPv4 or IPv6, over a radio or wireless interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). A RB signifies a service provided by the second layer (L2) for data transmission between a UE 10 and the E-UTRAN.

As illustrated in FIG. 2(b), the RLC and MAC layers are terminated in an eNB 20 on the network side and may perform functions such as scheduling, Automatic Repeat Request (ARQ), and hybrid automatic repeat request (HARQ). The PDCP layer is terminated in an eNB 20 on the network side and may perform the user plane functions such as header compression, integrity protection, and ciphering.

As illustrated in FIG. 2(c), the RLC and MAC layers are terminated in an eNB 20 on the network side and perform the same functions as for the control plane. As illustrated in FIG. 2(c), the RRC layer is terminated in an eNB 20 on the network side and may perform functions such as broadcasting, paging, RRC connection management, Radio Bearer (RB) control, mobility functions, and UE 10 measurement reporting and controlling. As illustrated in FIG. 2(c), the NAS control protocol is terminated in the MME of gateway 30 on the network side and may perform functions such as a SAE bearer management, authentication, LTE_IDLE mobility handling, paging origination in LTE_IDLE, and security control for signaling between the gateway and UE 10.

The NAS control protocol may use three different states. An LTE_DETACHED state is used if there is no RRC entity. An LTE_IDLE state is used if there is no RRC connection while storing minimal UE 10 information. An LTE_ACTIVE state is used if the RRC connection is established. Furthermore, the RRC state may be divided into two different states, such as RRC_IDLE and RRC_CONNECTED.

In RRC_IDLE state, the UE 10 may receive broadcasts of system information and paging information while the UE specifies a Discontinuous Reception (DRX) configured by the NAS and the UE has been allocated an identification (ID) which uniquely identifies the UE in a tracking area. Furthermore, no RRC context is stored in the eNB in RRC-IDLE state.

In RRC_CONNECTED state, the UE 10 has an E-UTRAN RRC connection and a context in the E-UTRAN, such that transmitting and/or receiving data to and from the eNB is possible. Furthermore, the UE 10 can report channel quality information and feedback information to the eNB.

In RRC_CONNECTED state, the E-UTRAN knows the cell to which the UE 10 belongs. Therefore, the network can transmit and/or receive data to and from the UE 10, control mobility, such as handover, of the UE, and perform cell measurements for a neighboring cell.

In RRC_IDLE mode, the UE 10 specifies the paging DRX Discontinuous Reception cycle. Specifically, the UE 10 monitors a paging signal at a specific paging occasion of every UE specific paging DRX cycle.

FIG. 3 illustrates the conventional LTE handover procedure. The UE 10 sends a measurement report to the source eNB 20 (S102). The source eNB 20 sends a handover request message with the UE 10 context to the target eNB (S104).

The target eNB 20 sends a handover request response to the source eNB (S106). The handover request response includes the new CRNTI, a portion of a handover command message and information related to random access, such as a dedicated access signature for the UE 10 to make a contention-free random access on the target cell. A signature is reserved at this time.

The source eNB 20 sends the handover command to the UE (S108). The handover command includes the new C-RNTI and information related to random access, such as the dedicated signature for the UE 10 to use.

A random access procedure is performed in the target cell after the handover command in order for the UE 10 to obtain the timing advance (TA) value. This random access procedure should be contention-free such that a signature is reserved to the UE 10 in order to avoid collision.

The UE 10 starts the random access procedure on the target eNB 20 by sending the random access preamble using a dedicated signature (S110). The target eNB 20 sends the random access response message to the UE 10 (S112). The random access response message includes the TA and uplink resource assignment. The UE 10 sends the handover complete message to the target eNB 20 (S114)

In the conventional procedure, the dedicated signature is reserved by the target eNB 20 once the target eNB sends the handover request (S104) and until the UE 10 sends the handover complete message (S114) and the target eNB receives the handover complete message.

DISCLOSURE

Technical Problem

Therefore, the conventional procedure results in high usage of RACH resources that could be a disadvantage to a new UE 10 trying perform handover.

The disadvantage may be due to a lack of dedicated signatures if handover fails, there is a long delay on the X2 interface, or if any additional target cell were prepared. Furthermore it is not clear when and how the target eNB 20 can re-use the reserved signature when, for example, a permanent handover failure occurs.

The use of an expiry time related to the dedicated signature would facilitate management of the dedicated signature in a more flexible way and reduce the resources that must be reserved. The behavior of the UE 10 upon expiration of the dedicated signatures is a critical issue.

Technical Solution

In one aspect of the present invention, a method of performing a handover operation in a wireless communication system is provided. The method includes communicating signal measurement information to a source base station, receiving a handover command from the source base station, the handover command including a first random access signature, target base station C-RNTI information and a signature expiration time provided by a target base station to the source base station, transmitting a first random access preamble using the first random access signature to the target base station, receiving a second random access signature from the target base station and retransmitting a second random access preamble using the second random access signature to the target base station when the signature expiration time expires.

It is contemplated that the first random access signature includes a dedicated signature and the second random access signature includes a new dedicated signature or a non-dedicated signature. It is further contemplated that the second random access signature includes a non-dedicated signature received through a broadcast channel.

It is contemplated that the signature expiration time is based on a synchronization estimation of a difference between system frame numbers of the source and target base stations. It is further contemplated that receiving the second random access signature includes receiving a new signature expiration time.

In another aspect of the present invention, a method of performing a handover operation in a wireless communication system is provided. The method includes communicating signal measurement information to a source base station, receiving a handover command from the source base station, the handover command including a dedicated random access signature, target base station C-RNTI information, a non-dedicated random access signature and a signature expiration time provided by a target base station to the source base station, transmitting a first random access preamble using the dedicated random access signature to the target base station and retransmitting a second random access preamble using the non-dedicated random access signature to the target base station when the signature expiration time expires.

It is contemplated that the non-dedicated signature is received through a broadcast channel. It is further contemplated that the signature expiration time is based on a synchronization estimation of a difference between system frame numbers of the source and target base stations.

In another aspect of the present invention, a mobile terminal for performing a handover operation in a wireless communication system is provided. The mobile terminal includes a transmitting unit for transmitting signals, a receiving unit for receiving signals, a display unit for displaying information, an input unit for receiving inputs from a user and a processing unit controlling the transmitting unit to transmit signal measurement information to a source base station, processing a handover command received from the source base station, the handover command including a first random access signature, target base station C-RNTI information and a signature expiration time provided by a target base station to the source base station, controlling the transmitting unit to transmit a first random access preamble using the first random access signature to the target base station, processing a second random access signature received from the target base station and controlling the transmitting unit to retransmit a second random access preamble using the second random access signature to the target base station when the signature expiration time expires.

It is contemplated that the first random access signature includes a dedicated signature and the second random access signature includes a new dedicated signature or a non-dedicated signature. It is further contemplated that the second random access signature includes a non-dedicated signature received through a broadcast channel.

It is contemplated that the signature expiration time is based on a synchronization estimation of a difference between system frame numbers of the source and target base stations. It is further contemplated that processing the second random access signature includes processing a new signature expiration time.

In another aspect of the present invention, a mobile terminal for performing a handover operation in a wireless communication system is provided. The mobile terminal includes a transmitting unit for transmitting signals, a receiving unit for receiving signals, a display unit for displaying information, an input unit for receiving inputs from a user and a processing unit controlling the transmitting unit to transmit signal measurement information to a source base station, processing a handover command received from the source base station, the handover command including a dedicated random access signature, target base station C-RNTI information, a non-dedicated random access signature and a signature expiration time provided by a target base station to the source base station, controlling the transmitting unit to transmit a first random access preamble using the dedicated random access signature to the target base station, and controlling the transmitting unit to retransmit a second random access preamble using the non-dedicated random access signature to the target base station when the signature expiration time expires.

It is contemplated that the non-dedicated signature is received through a broadcast channel. It is further contemplated that the signature expiration time is based on a synchronization estimation of a difference between system frame numbers of the source and target base stations.

In another aspect of the present invention, a method of performing a handover operation in a wireless communication system is provided. The method includes communicating signal measurement information to a source base station, receiving a handover command from the source base station, the handover command including target base station C-RNTI information provided by a target base station to the source base station, receiving a first random access signature from the target base station, transmitting a random access preamble including the first random access signature to the target base station and receiving a second random access signature from the target base station if receipt acknowledgement of random access preamble is not received from the target base station, wherein the first random access signature is recognized as a random access signature for accessing the target base station until the second random access signature is received from the target base station.

It is contemplated that the first and second random access signatures are dedicated signatures. It is further contemplated that the method further includes performing a contention-based random access of the target base station when either the first or second random access signature is not received.

In another aspect of the present invention, a method of performing a handover operation in a wireless communication system is provided. The method includes communicating signal measurement information to a source base station, receiving a handover command from the source base station, the handover command including target base station C-RNTI information provided by a target base station to the source base station, receiving a first random access signature from the target base station, transmitting a random access preamble including the first random access signature to the target base station, receiving a random access response including a timing advance and uplink resource assignment and transmitting a handover complete message to the target base station, wherein the first random access signature is recognized as random access signature for accessing the target base station when the first random access signature is transmitted by the target base station.

In another aspect of the present invention, a method of performing a handover operation in a wireless communication system is provided. The method includes communicating signal measurement information to a source base station, receiving a handover command from the source base station, the handover command including a first random access signature and target base station C-RNTI information provided by a target base station to the source base station, transmitting a random access preamble including the first random access signature to the target base station and receiving a second random access signature from the target base station if receipt acknowledgement of the random access preamble is not received from the target base station, wherein the first random access signature is recognized as a random access signature for accessing the target base station until the second random access signature is received from the target base station.

In another aspect of the present invention, a mobile terminal for performing a handover operation in a wireless communication system is provided. The mobile terminal includes a transmitting unit for transmitting signals, a receiving unit for receiving signals, a display unit for displaying information, an input unit for receiving inputs from a user and a processing unit controlling the transmitting unit to transmit signal measurement information to a source base station, processing a handover command received from the source base station and a first random access signature received from a target base station, the handover command including target base station C-RNTI information provided by the target base station to the source base station, controlling the transmitting unit to transmit a first random access preamble including the first random access signature to the target base station, and processing a second random access signature received from the target base station if receipt acknowledgement of random access preamble is not received from the target base station, wherein the processing unit recognizes the first random access signature as a random access signature for accessing the target base station until the second random access signature is received from the target base station.

It is contemplated that the first and second random access signatures are dedicated signatures. It is further contemplated that the processing unit further performs a contention-based random access of the target base station when either the first or second random access signature is not received.

In another aspect of the present invention, a mobile terminal for performing a handover operation in a wireless communication system is provided. The mobile terminal includes a transmitting unit for transmitting signals, a receiving unit for receiving signals, a display unit for displaying information, an input unit for receiving inputs from a user and a processing unit controlling the transmitting unit to transmit signal measurement information to a source base station, processing a handover command received from the source base station and a first random access signature received from a target base station, the handover command including target base station C-RNTI information provided by the target base station to the source base station, controlling the transmitting unit to transmit a first random access preamble including the first random access signature to the target base station, processing random access response including a timing advance and uplink resource assignment, and controlling the transmitting unit to transmit a handover complete message to the target base station, wherein the processing unit recognizes the first random access signature as a random access signature for accessing the target base station when the first random access signature is transmitted by the target base station.

In another aspect of the present invention, a mobile terminal for performing a handover operation in a wireless communication system is provided. The mobile terminal includes a transmitting unit for transmitting signals, a receiving unit for receiving signals, a display unit for displaying information, an input unit for receiving inputs from a user and a processing unit controlling the transmitting unit to transmit signal measurement information to a source base station, processing a handover command received from the source base station, the handover command including a first random access signature and target base station C-RNTI information provided by a target base station to the source base station, controlling the transmitting unit to transmit a random access preamble including the first random access signature to the target base station, and processing a second random access signature received from the target base station if receipt acknowledgement of the random access preamble is not received from the target base station, wherein the processing unit recognizes the first random access signature as a random access signature for accessing the target base station until the second random access signature is received from the target base station.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

Advantageous Effects

First, the dedicated signature reservation time is lower, which could result in a benefit if the processing time in the current baseline for the target eNB sending the handover request response to the source eNB and the source eNB sending the handover command to the UE are sufficient to allow the UE to perform a random access procedure. Second, a dedicated signature can be sent several times by the target UE with information related to the validity of this signature in terms of relative SFN, which also allows a more flexible management of the dedicated signatures since the target eNB can resend different dedicated signatures and different validity times.

DESCRIPTION OF DRAWINGS

The accompanying drawings, which are included to provide a further understanding of the invention and are incorporated in and constitute apart of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIGS. 2(*b*) and 2(*c*) illustrate the user-plane protocol and control-plane protocol for the E-UMTS.

FIG. 4(*b*) illustrates a second embodiment of using of a dedicated signature expiry time in a handover procedure baseline according to the present invention.

FIG. 5(*b*) illustrates an optional first alternative baseline for inter-eNB handover according to the present invention.

BEST MODE

Reference will now be made in detail to the preferred embodiments of the present invention, examples of which are illustrated in the accompanying drawings. One aspect of the present invention is directed to UE 10 behavior upon expiration of a dedicated signature. Another aspect of the present invention provides an alternative method for the allocation of the dedicated signature used for a contention-free random access during the handover procedure.

One issue that must be addressed with respect to the use of an expiry timer for the dedicated signature is whether the UE 10 must read the system frame number (SFN) on the target cell prior to the handover. The present invention is based on the assumption that expiration of a dedicated signature reservation can be indicated to the UE 10 based on the source SFN such that the UE knows when its assigned dedicated signature expires based on the timing of the source cell of which the UE is aware.

Figure 1:
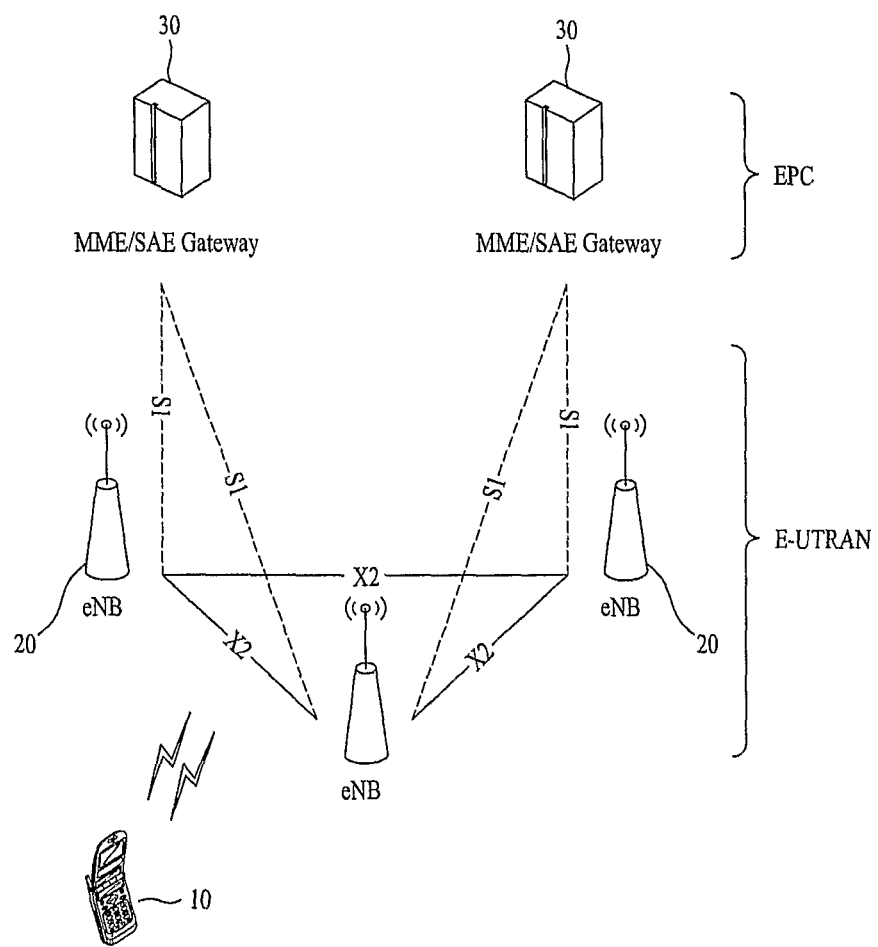
FIG. 1 illustrates the network structure of an E-UMTS.
Figure 2A:
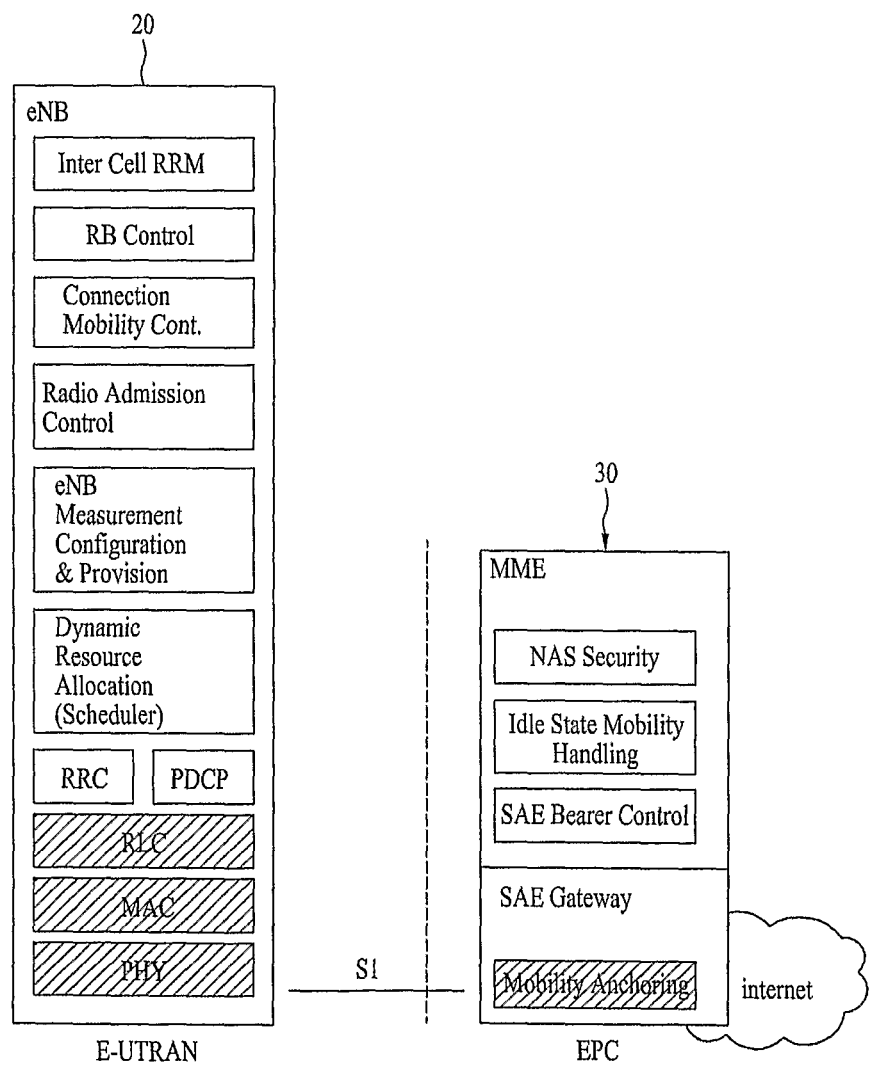
FIG. 2(*a*) illustrates the architecture of an E-UTRAN and gateway.
Figure 2B:
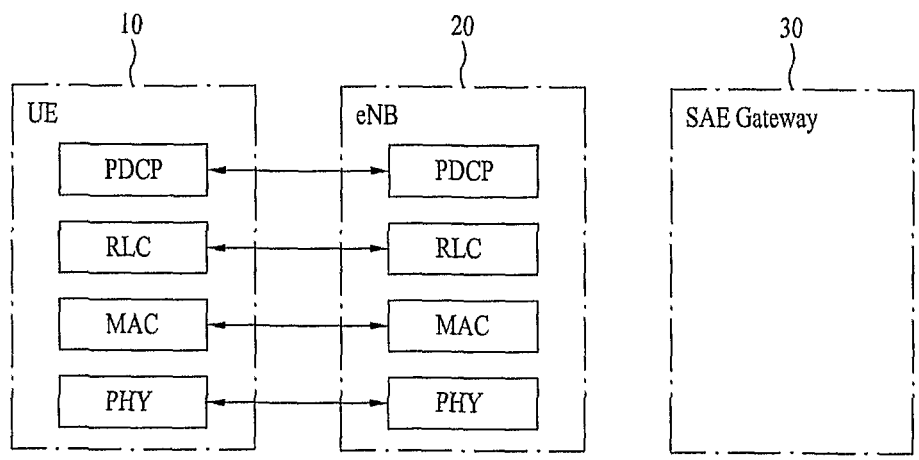
Figure 2C:
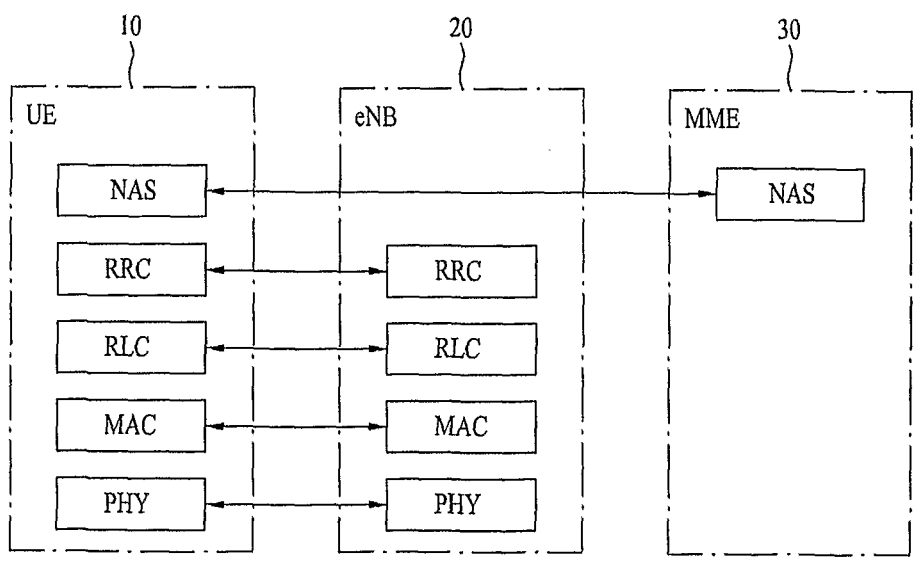
Figure 3:
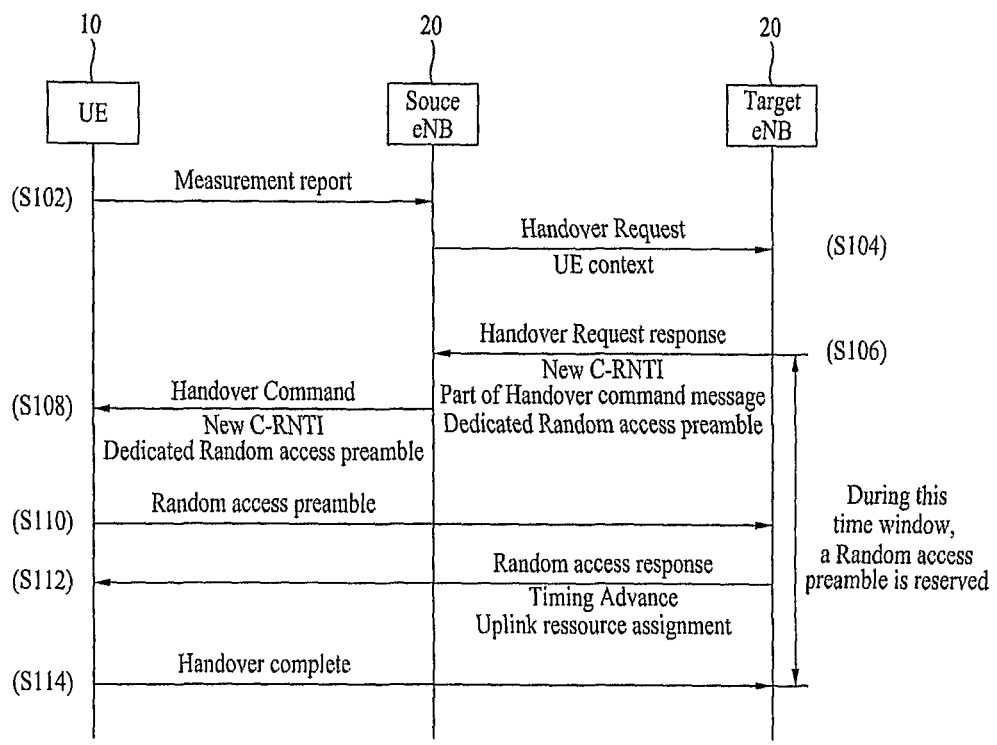
FIG. 3 illustrates the conventional handover procedure for LTE.

In the conventional handover procedure illustrated in FIG. 3, both the source eNB 20 and the target eNB can synchronize prior to the handover procedure. This synchronization allows both the source eNB 20 and the target eNB to know the difference between source SFN and target SFN.

On approach proposed by the present invention is that the target eNB 20 can include the expiry time of the dedicated signature in the handover command in terms of the source SFN or based on a UE 10 specific connection frame number or timing. Alternately, the target eNB 20 can indicate the expiry time in terms in terms of the target SFN and the source eNB translates the expiry time in terms of the source SFN or UE specific timing prior to transmitting to the UE.

Another approach proposed by the present invention is to include the expiry time of the dedicated signature in the handover command in terms of target SFN and the difference between the source SFN and target SFN. The UE 10 can derive the expiry time of the dedicated signature in terms of source SFN using this information. The UE 10 can also derive the target SFN using this information.

Figure 4A:
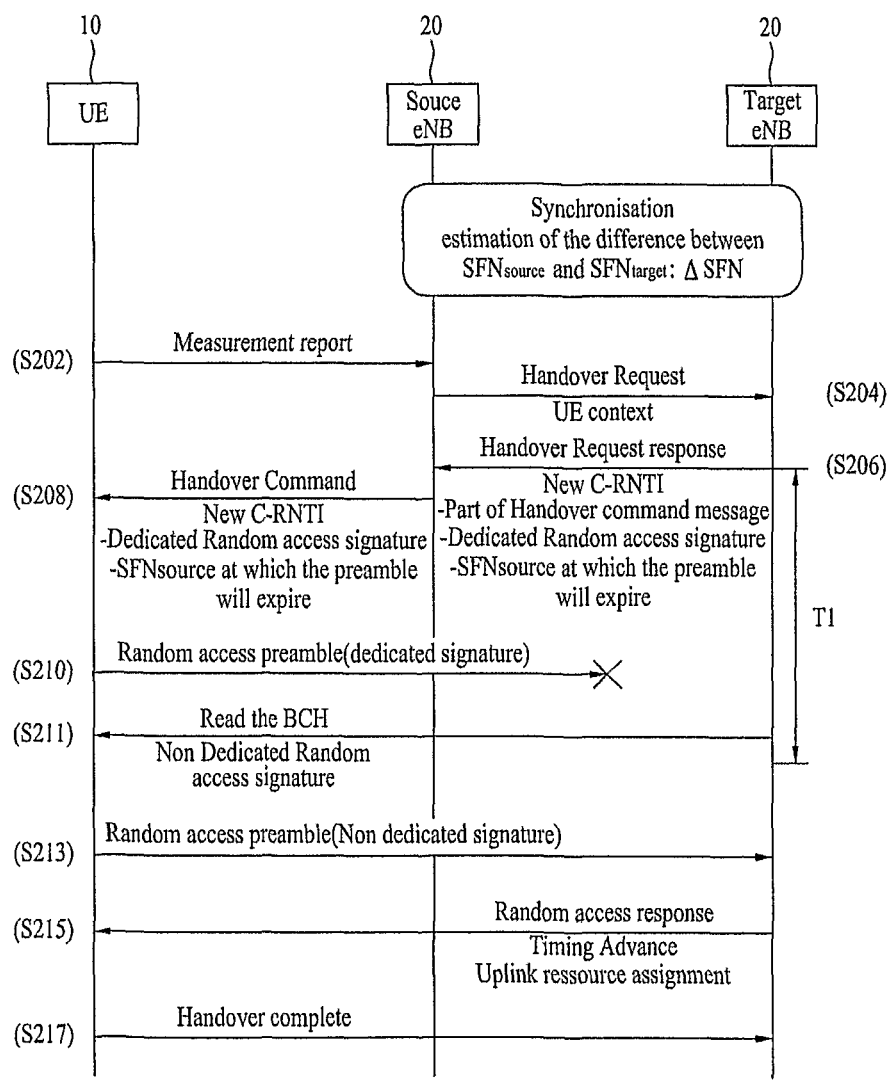
FIG. 4(*a*) illustrates a first embodiment of using of a dedicated signature expiry time in a handover procedure baseline according to the present invention.
Figure 4B:
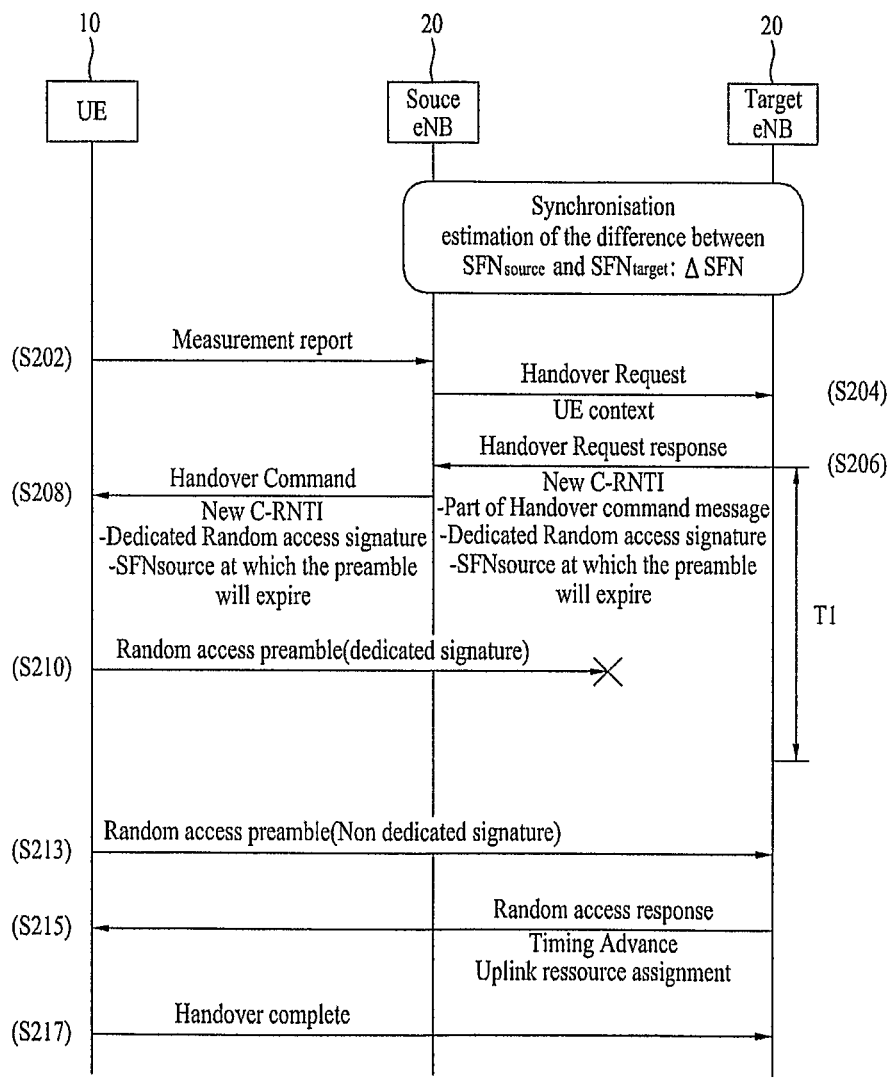

As illustrated in FIGS. 4(*a*) and 4(*b*), there are two alternatives for the UE 10 to continue trying to access the RACH if the dedicated signature is not transmitted or if the eNB 20 doesn't receive the dedicated signature upon expiration of the signature timer. In both alternatives, a UE 10 that didn't make a successful random access attempt using a dedicated signature will continue attempting random access using a signature taken from a set of contention-based RA signatures. The difference between the alternatives is the way the UE 10 obtains this contention-based random access signature.

In the first alternative illustrated in FIG. 4(*a*), a UE 10 must read the target cell BCH (S211) and retrieve the available signatures that are used in the target cell in order to transmit the non-dedicated signature (S213) for contention-based random access attempts as well as indications of a specific set to which each signature belongs.

In the second alternative illustrated in FIG. 4(*b*), the handover request response message (S206) includes a random access signature chosen randomly from among the contention-based random access signatures in addition to a portion of the handover command message, the new CRNTI, the dedicated signature and the source SFN at which the signature expires.

Information related to the set from which the signature was chosen may also be included in the handover request response message such that the UE 10 is informed of the size of resources that it will be allocated in the target cell. The target eNB 20 may base the decision on measurement information that the UE 10 has reported to the source eNB and that the source eNB has transferred to the target eNB.

In a third alternative, the target cell sends a new dedicated signature to the UE 10. New expiry time information must also be provided.

Figure 5A:
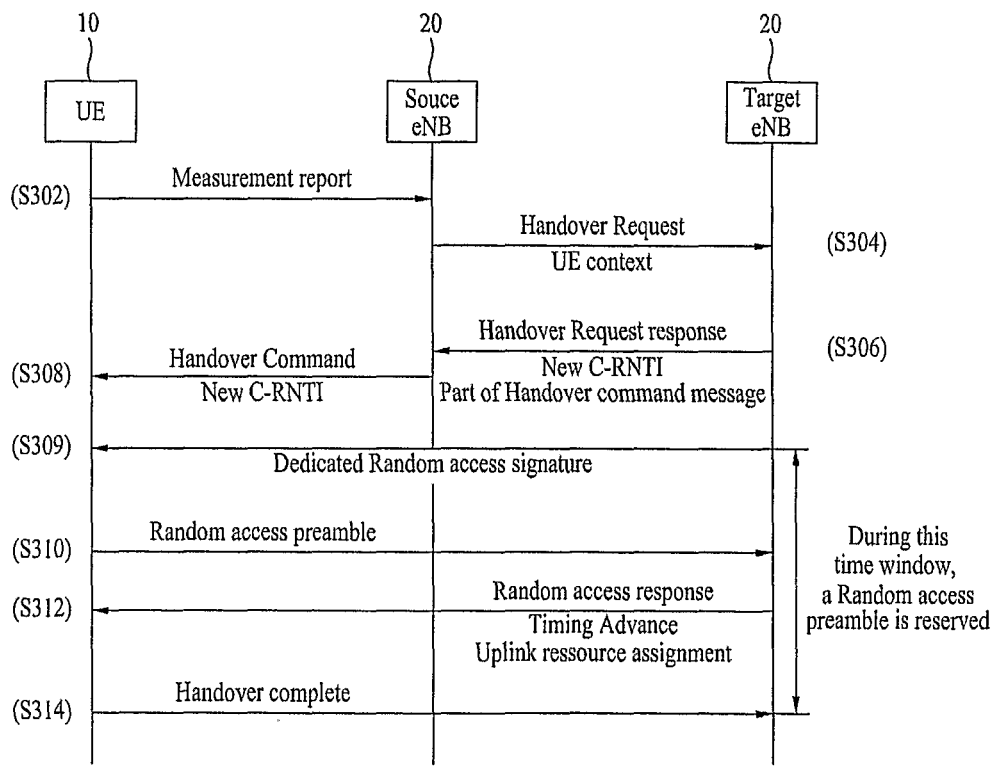
FIG. 5(*a*) illustrates a first alternative baseline for inter-eNB handover according to the present invention.
Figure 5B:
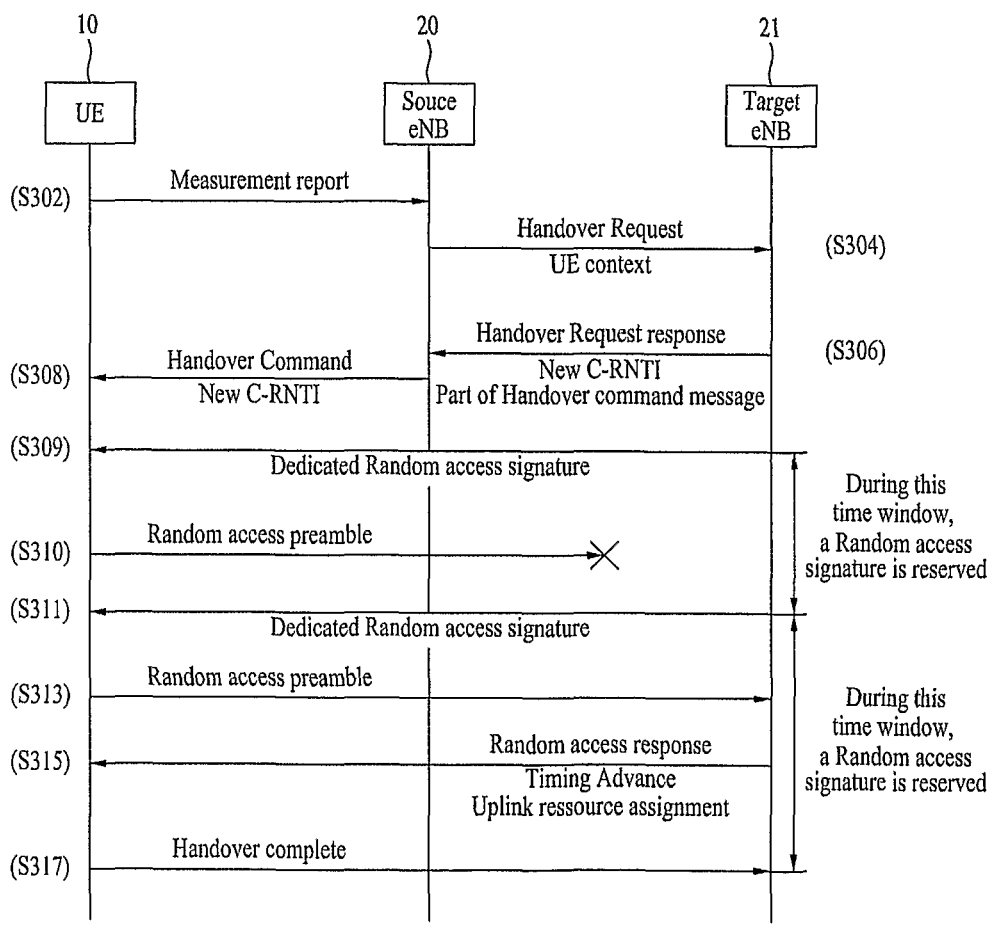

FIG. 5(*a*) illustrates a first alternate baseline for inter-eNB handover according to the present invention. The UE 10 sends a measurement report to the source eNB 20 (S302). The source eNB 20 sends a handover request message with the UE 10 context to the target eNB 20 (S304).

The target eNB 20 sends the handover request response to the source eNB (S306). The handover request response includes the new CRNTI, part of the handover command message and information related to ransom access. However, the handover request response does not include any dedicated signature since no signature is reserved at this point.

The source eNB 20 sends the handover command to the UE 10 (S308) with the new C-RNTI and information related to random access. However, no dedicated signature is includes as no dedicated signature has not been reserved at this time.

The target eNB 20 sends information related to an available dedicated signature to the UE 10 (S309) with potential information related to the time for which the signature has been reserved. The UE 10 may already know information related to the root sequences to use and the cyclic shift size from the handover command.

The UE 10 then initiates the random access procedure on the target eNB 20 by sending the random access preamble using the dedicated signature (S310). The target eNB 20 sends the random access response message to the UE 10 (S312) with the TA and uplink resource assignment The UE 10 sends the handover complete message to the target eNB 20 (S314).

As illustrated in FIG. 5(*a*), the dedicated signature is no longer sent by the source eNB 20 with the handover command (S306). Instead, the dedicated signature is sent later by the target eNB 20 (S309).

One option to the first alternative baseline illustrated in FIG. 5(*a*) is the UE 10 performing a contention-based random access procedure if the UE does not receive the dedicated signature from the target eNB 20 (S210). A second option to the first alternative baseline illustrated in FIG. 5(*a*) is illustrated in FIG. 5(*b*) in which the target eNB 20 resends a dedicated signature (S311), such as the same dedicated signature, if the random access preamble is not received from the UE 10 (S310) after sending the dedicated signature to the UE (S309).

The first alternative baseline illustrated in FIGS. 5(*a*) and 5(*b*) provides several advantages. First, the dedicated signature reservation time is lower, which could result in a benefit if the processing time in the current baseline for the target eNB 20 sending the handover request response to the source eNB 20 (S306) and the source eNB 20 sending the handover command to the UE 10 (S308) are sufficient to allow the UE to perform a random access procedure. Second, a dedicated signature can be sent several times by the target UE 20 with information related to the validity of this signature in terms of relative SFN, which also allows a more flexible management of the dedicated signatures since the target eNB can resend different dedicated signatures and different validity times.

Figure 6:
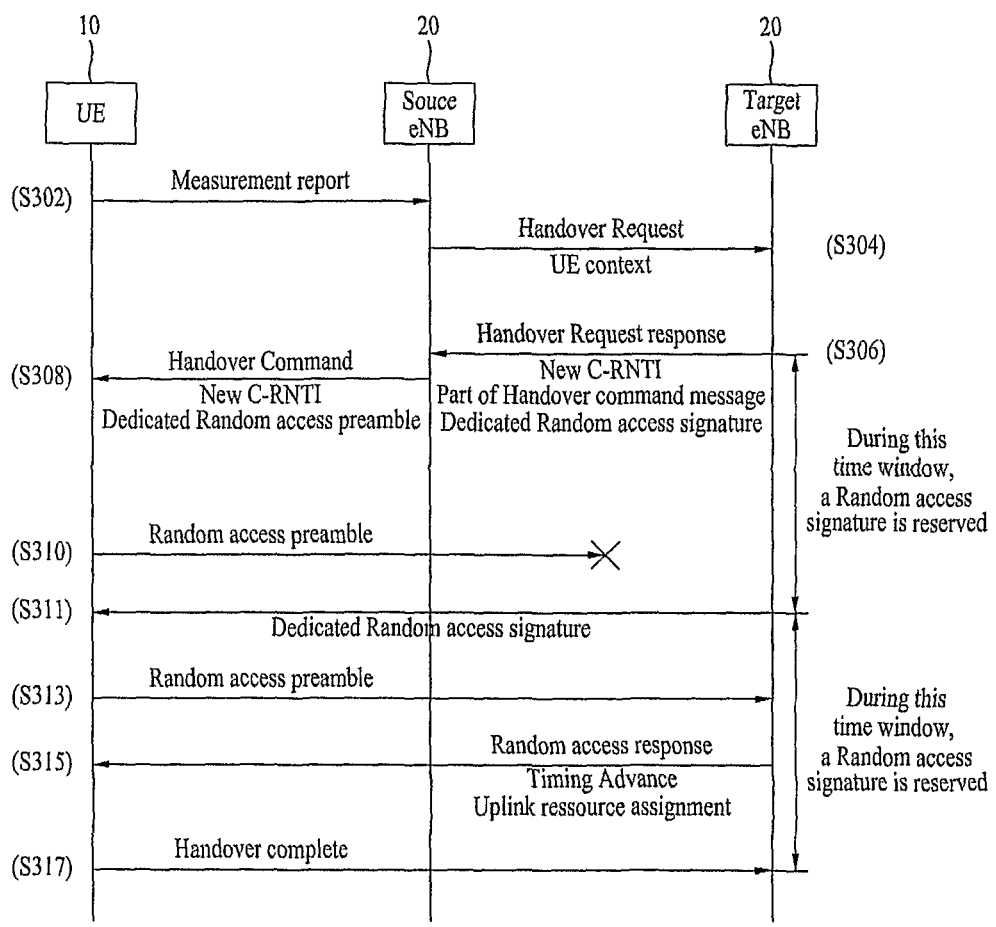
FIG. 6 illustrates a second alternative baseline for inter-eNB handover according to the present invention.

FIG. 6 illustrates a second alternate baseline for inter-eNB handover according to the present invention. The procedure illustrated in FIG. 6 is essentially the same as the conventional handover baseline illustrated in FIG. 3 in which the dedicated signature is provided to the UE 10 in the handover request response (S306). However, as illustrated in FIG. 6, the target eNB 20 can send a dedicated signature directly to the UE 10 (S311) along with information related to the validity of this signature using the C-RNTI.

As illustrated In FIG. 6, the target eNB 20 manages the dedicated signatures in a more flexible way if the first random access preamble is not received by the target eNB 20 (S310). For example, the target eNB 20 may allocate the first dedicated signature sent in the handover request response (S306) for a shorter time and reserve a new dedicated signature, which may be the same dedicated signature, that is sent directly to the UE 10 (S311) with a new validity time if necessary.

Figure 7:
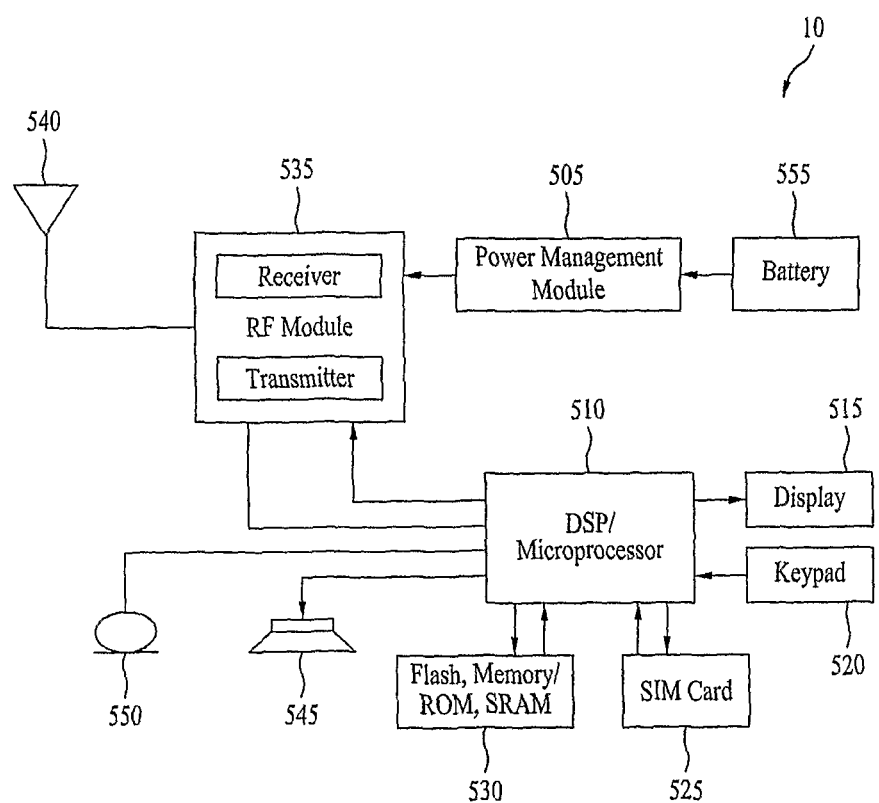
FIG. 7 illustrates a block diagram of a mobile station according to the present invention.

FIG. 7 illustrates a block diagram of a mobile station (MS) or UE 10. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

INDUSTRIAL APPLICABILITY

The present invention is directed to optimization of the LTE handover procedure and, specifically, to alternatives for allocating a dedicated signature used for contention-free random access during the handover procedure as well as using an expiry time for a dedicated signature and different alternative behaviors for a mobile terminal upon expiry of the dedicated signature.

The invention claimed is:

1. A method of performing a handover operation in a wireless communication system, the method comprising:
communicating signal measurement information to a source base station;
receiving a handover command from the source base station;
receiving a dedicated random access signature, a signature expiration time and information related to validity of the dedicated random access signature from a target base station, wherein the dedicated random access signature and the signature expiration time are reserved by the target base station;
transmitting a first random access preamble using the dedicated random access signature to the target base station;
receiving a new dedicated random access signature and a new signature expiration time from the target base station, when the first random access preamble is not received at the target base station when the signature expiration time expires; and
retransmitting a second random access preamble using the new dedicated random access signature to the target base station,
wherein the new dedicated random access signature is same as the dedicated random access signature.

2. The method of claim 1, wherein the signature expiration time is based on a synchronization estimation of a difference between system frame numbers of the source and target base stations.

3. A mobile terminal for performing a handover operation in a wireless communication system, the mobile terminal comprising:
a transmitting unit for transmitting signals;
a receiving unit for receiving signals;
a display unit for displaying information;
an input unit for receiving inputs from a user; and
a processing unit for controlling the transmitting unit to transmit signal measurement information to a source base station, processing a handover command received from the source base station, controlling the receiving unit to receive a dedicated random access signature, a signature expiration time and information related to validity of the dedicated random access signature from a target base station, wherein the dedicated random access signature and the signature expiration time are reserved by the target base station, controlling the transmitting unit to transmit a first random access preamble using the dedicated random access signature to the target base station, controlling the receiving unit to receive a new dedicated random access signature and a new signature expiration time from the target base station, when the first random access preamble is not received at the target base station when the signature expiration time expires, and controlling the transmitting unit to retransmit a second random access preamble using the new dedicated random access signature to the target base station,
wherein the new dedicated random access signature is same as the dedicated random access signature.

4. The mobile terminal of claim 3, wherein the signature expiration time is based on a synchronization estimation of a difference between system frame numbers of the source and target base stations.

* * * * *